March 24, 1942.    A. M. GRAHAM    2,277,397
HOSE AND HOSE CONNECTOR CONSTRUCTION
Filed Jan. 15, 1940    2 Sheets-Sheet 1
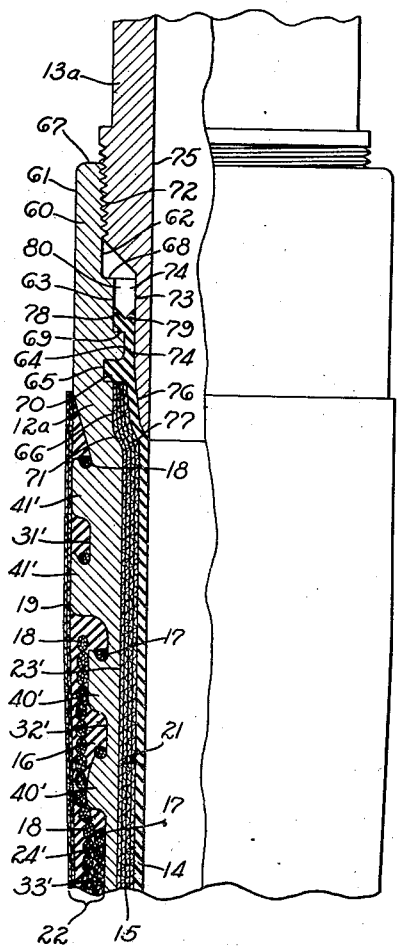
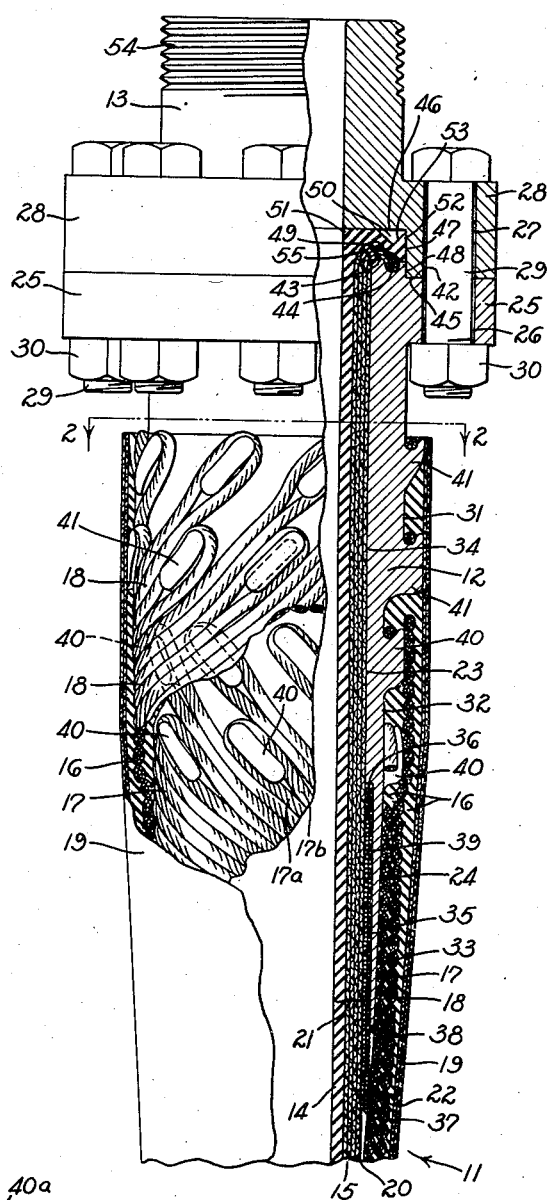
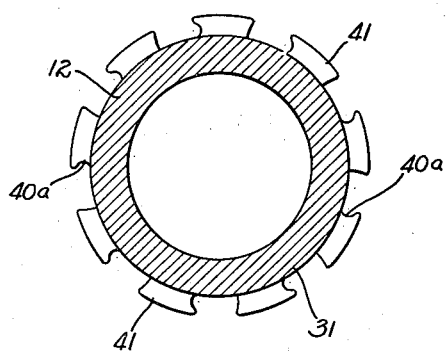
INVENTOR
ADELBERT M. GRAHAM
BY HARRIS, KIECH, FOSTER & HARRIS
ATTORNEYS.

March 24, 1942.  A. M. GRAHAM  2,277,397
HOSE AND HOSE CONNECTOR CONSTRUCTION
Filed Jan. 15, 1940   2 Sheets-Sheet 2

INVENTOR
ADELBERT M. GRAHAM
BY HARRIS, KIECH, FOSTER & HARRIS
Clarence F. Kiech
FOR THE FIRM
ATTORNEYS.

Patented Mar. 24, 1942

2,277,397

UNITED STATES PATENT OFFICE 2,277,397

HOSE AND HOSE CONNECTOR CONSTRUCTION

Adelbert M. Graham, Beverly Hills, Calif., assignor to Walter G. L. Smith, Los Angeles, Calif.

Application January 15, 1940, Serial No. 313,915

3 Claims. (Cl. 285—8)

This invention relates to high pressure hose couplings and while it finds utility wherever hose and the couplings therefor are subjected to high internal fluid pressure, it is particularly adapted for use in the well drilling industry where couplings are used to connect a section of hose to the swivel of a rotary drilling apparatus and to the standpipe which leads to a slush pump, so that mud under heavy pressure often as high as ten thousand pounds per square inch may be supplied to the tools during the drilling operation.

In couplings of this character the end portion of the hose section is permanently secured to a primary metallic member to form one element of the coupling, and the other element comprises a secondary metallic member which is rigidly secured to the primary metallic member, usually by a ring of bolts or by screw threads, and is further provided with means for being secured to the swivel or standpipe. Due to the great pressure of the mud fluid, it is very difficult to provide satisfactory joints between the hose and primary metallic member. In one of the usual constructions for joints of this character the primary metallic member comprises a sleeve which is inserted into the end of the hose, and clamps placed around the hose so as to force the hose material into intimate contact with roughened projections on the sleeve.

There are several disadvantages of this type of joint. The hose is circumferentially stretched and weakened by the sleeve. Fluid may be forced through the joint formed between the hose and the outer surface of the sleeve, weakening the hose and eventually causing leakage between the mating surfaces of the two metallic elements. The hose is also weakened and often ruptured at a point adjacent the inner end of the sleeve, remote from the other metallic element, by the bending moment applied to the hose at this point. There is also danger of the hose becoming separated from the sleeve as the hose shrinks during use.

According to this invention a sleeve is used as one of the metallic members of the coupling and at the inner end of this sleeve the radially inner and radially outer portions of the hose wall are divided into two layers or plies and lead along the bore and outside surfaces of the sleeve respectively, the inner ply terminating in an annular chamber between the two metallic members where it is brought into a fluid tight seal with these members by pressure of the fluid in the hose to prevent leakage either along the bore surface of the sleeve or between the two metallic members, and the outer ply being secured to the outside surface of the sleeve in a manner to carry the tensile stresses between the coupling and the hose, and to securely anchor the hose on the sleeve.

It is accordingly an object of this invention to provide a coupling which will not leak, and which will not separate longitudinally. It is a further object of this invention to provide a coupling which will protect the hose against the destructive action of bending moments at the inner end of the coupling.

Other features and objects of my invention will be evidenced in the following description and claims.

In the drawings:

Fig. 1 is a partially sectional longitudinal view of a coupling embodying my invention.

Fig. 2 is a sectional view of the coupling sleeve taken along the line 2—2 of Fig. 1.

Fig. 3 is a partially sectioned longitudinal view of a modified form of coupling also embodying my invention.

Figure 4:
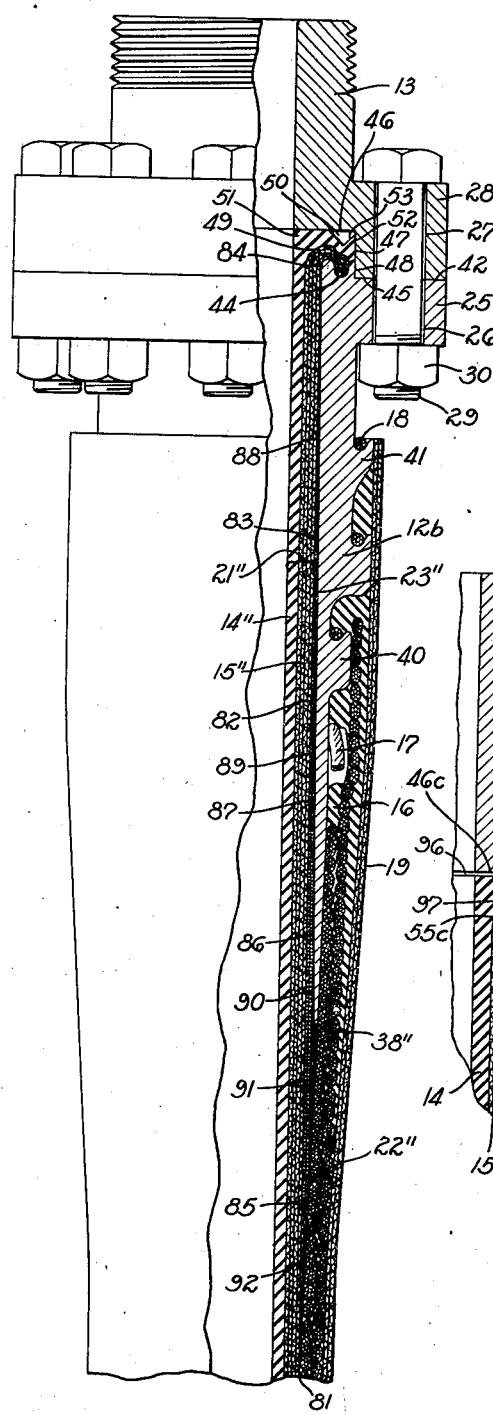
Fig. 4 is a partially sectioned longitudinal view of still another form of coupling embodying my invention.

In the embodiment of my invention shown in Figs. 1 and 2, a hose 11 is secured permanently to a sleeve 12, constituting the first or primary metallic member of the coupling, which member is removably secured to a secondary metallic member 13, adapted to be connected to a swivel or standpipe of a rotary drilling rig.

The hose selected for the purpose of illustrating this invention is of the kind described in Patent No. 2,151,307. While some of the features of this invention are predicated on some of the features of construction of the hose disclosed in the description and drawings of that patent, as to other features of this invention, either a hose of the kind shown in the aforesaid patent or hose of other kinds may be used.

The hose shown in the drawings comprises an inner rubber tube 14, a plurality of layers of fabric 15 contiguously enveloping the tube 14, next a layer of rubber 16, in which are embedded a radially inner layer of spirally wound twisted wire cables 17 and a radially outer layer of spirally wound twisted wire cables 18 and then an outside covering layer 19 of fabric. As shown in the drawings the inner cables 17 are wound in an upward right-hand spiral manner and the outer cables 18 are wound in an upward left-hand spiral manner as shown in Fig. 1. Preferably these cables are formed of single wire strands which are wound within the cable in a twist of the opposite hand to that in which the cable as a whole is wound within the hose. Also, preferably, the cables are separated from each other and the fabric layers by intervening rubber material.

The primary element of the coupling comprises the primary metallic member or sleeve 12 and the end of the hose 11, which are secured together in a novel and effective fashion. The hose is divided at 20 into an inner ply 21 and an outer ply 22. The inner ply 21 comprises the layers 14 and 15 and the outer ply 22 comprises the layers 16 and 19 with the embedded cables 17 and 18. The inner ply 21 is placed in contact with an inner bore surface 23 of the sleeve 12 and the outer ply is placed in contact with an outside surface 24 of the sleeve 12.

The sleeve 12 is formed at its longitudinally outer end (the upper end in Fig. 1) with an annular flange 25 having bolt holes 26 registering with bolt holes 27 in an annular flange 28 formed on the secondary metallic member 13. Bolts 29 and nuts 30 serve to secure together the sleeve 12 and member 13. The outside surface 24 of the body portion of the sleeve 12, which extends toward the hose and lies between outer and inner hose plies 21 and 22, is divided into a longitudinally outer portion 31 adjacent the flange 25, a longitudinally intermediate portion 32 of lesser diameter, and a longitudinally innermost conical portion 33. The bore surface 23 of the sleeve 12 is divided into a longitudinally outer portion 34 which extends the full length of the flange 25 and of the surfaces 31 and 32, and a longitudinally inner portion 35 of slightly larger diameter which is substantially co-extensive with the conical surface 33, the body of the sleeve between the surfaces 33 and 35 at its extreme inner end having the form of a tapered thin walled shell. Seated within the larger bore surface 35 and extending from its outer end 36 to a point 37 which is well beyond the inner end 38 of the sleeve is a thin cylindrical shell 39 formed of one or more layers of spirally wound wire, with a bore diameter the same as that of the bore 34. This shell 39 acts as a stiffener resisting bending stresses which tend to break down and rupture the hose at the end 38 of the sleeve.

The surface 32 is provided with two annular rows of diagonally placed elongated lugs 40, the lugs of one row being staggered longitudinally of the sleeve with respect to the lugs of the other row. Similarly, lugs 41 are provided on the surface 31, where they are disposed in two annular rows, these lugs being diagonally inclined with respect to the coupling axis in a direction opposite to that of the inclination of the lugs 40. Adjacent cable lengths 17 in pairs as 17a and 17b, are portions of one continuous integral cable length which is wound about one of the lugs 40, each of which is grooved at its outer end at 40a to receive the turn of the cable. If the other end of the hose is provided also with a coupling structure of my invention, the cable strands 17 may all be portions of one continuous cable length, providing great strength in the cable to resist both longitudinal and bursting stresses. Cable strands 18 are similarly wound about the lugs 41. After the cable strands 17 and 18 are placed in position on the sleeve, rubber in proper quantity is applied between and upon the cable strands and the fabric cover 19 is wound or otherwise applied to the structure, which is then vulcanized.

The inner ply 21 of the hose is bent at its outer end around the outer end of the sleeve. The end of the sleeve is formed with two annular end faces 42 and 43 longitudinally offset from each other. The bolt holes 26 pass through the flange 25 and end face 42. The end face 43 is formed with an annular recess or groove 44 of arcuate cross section. The secondary member 13 has a bore diameter equal to the bore diameter of the hose 11. Its end which faces the primary member or sleeve 12 is also formed with two annular end faces 45 and 46, providing between them a cylindrical bore face 47 of greater length than the cylindrical face 48 between the end faces 42 and 43 of the sleeve 12, whereby an annular chamber 49 is formed between the faces 43, 47 and 46.

The outer bent end 55 of the inner ply 21 of the hose constitutes a flange or ring which is seated in this chamber 49. It is molded and vulcanized on the sleeve 12 to a form presenting the cross-sectional contour shown in Fig. 1 before the member 13 is placed in position. The mold form used is of the same shape as the member 13 as to faces 46 and 47, except that it has an annular flange of triangular cross section for making an annular recess or groove 50 of triangular cross section in the rubber tube portion 14 of the hose. In the molding operation, rubber material is added to the rubber tube 14 in sufficient quantity to fill out the corners of the chamber 49, as at 51 and 52.

After the outer end of the hose ply 21 is molded to the form shown in Fig. 1, the member 13 is placed in position and the nuts 30 are turned to draw the end face 45 of member 13 into contact with the end face 42 of the sleeve 12. The hose material is not clamped between the members 12 and 13 under longitudinal compression. That portion of the fabric layer 15 which lies within the groove 44, keys the hose against accidental radial displacement when the members 12 and 13 are disassembled.

In use, the fluid within the hose finds its way into the recess 50 and applies to the walls of this recess the fluid pressure existing within the hose. Pressure applied to the radially outer wall 53 of the recess 50 forces the rubber material at 52 tightly against the surface 47, effectively preventing any leakage along the surface 47 to the joint between the faces 42 and 45, or the joint between the hose ply 21 and bore face 23 of the sleeve 12. The member 13 is threaded at 54 to provide for its attachment to a swivel or standpipe fixture as the case may be.

While it is preferable to provide the recess 50, such a recess is not necessary to an embodiment of this invention. If the recess is omitted, fluid pressure exerted on the bore face or end face of the flange 55 of the hose seated in the chamber 49 will force the material of the flange 55 against the faces 47 and 43 of the metallic members 13 and 12 respectively and thereby provide an effective fluid-tight seal.

Fig. 3 shows a coupling embodying this invention in modified form. The hose is made up of elements 14 to 19 like those shown in Fig. 1. The inner ply 21 of the hose is separated from the outer ply 22, the former being placed in contact with the bore surface 23' of a sleeve 12a and the latter being placed in contact with the outside surface 24' of the sleeve 12a. The cable strands 17 and 18 are secured to the sleeve lugs 40' and 41' in the same manner as shown in Fig. 1. The outer end portion 60 of the sleeve 12a (the upper end as it appears in the drawings) which lies beyond the lugs 41' has a cylindrical outside surface 61 with a diameter somewhat larger than the outside surface 31' on which are formed the lugs 41'. The bore face 62 of the end portion 60 of the sleeve 12a is formed with several longitudinal sections of different diameters, i. e., 62, 63, 64, 65, and 66. Sections 62, 63, and 64, beginning at the end face 67 of the sleeve are of progressively smaller diameter and provide annular shoulders 68 and 69. The diameter of section 65 is greater than that of the adjoining sections 64 and 66, providing an annular recess 70. Section 66 is connected to the bore surface 23' of the inner end portion of the sleeve 12a by an inwardly tapering bore section 71.

The longitudinally outer portion of section 62 is threaded at 72. A fitting 13a, constituting the secondary coupling member, is correspondingly threaded and when screwed into position as shown in the drawings is mechanically secured in a manner to effect a fluid-tight joint with the sleeve 12a. The inner portion 73 of the member 13a is of a smaller diameter than the threaded outer end thereof, and forms with the several sections of the bore face of the sleeve an annular chamber 74 with a cross sectional contour as shown in the drawings. The inner end portion 76 of the member 13a is tapered centrally to meet the bore face 75 of the member 13a at the extreme inner end of that member.

In fabricating the coupling, the inner ply portion 21 of the hose is cut off at the inner end of the recess 70, is expanded somewhat at 77, and pressed against the inside of the sleeve 12a by the insertion of a mold form shaped like the inner end portion of the member 13a. Prior to positioning the mold form, rubber material is added to the inner end of the ply 21 in sufficient quantity so that when the mold form is placed in position, the rubber material will fill the chamber 74 from the end of the ply 21 to two annular end faces 78 and 79, which in the assembled coupling extend from the surfaces 63 and 73 respectively, and form where they meet an angle of approximately 90 degrees with each other. The angular end faces 78 and 79 are formed by the use of a correspondingly shaped mold during the process of vulcanizing upon the sleeve 12a the outer end of the hose ply 21 and the rubber material added at the end thereof. When the sleeve and hose thus vulcanized together are assembled with the member 13a, an annular void 80 is presented between sleeve 12a and member 13a, extending from the faces 78 and 79 to the threaded joint at 72.

When the coupling is in use and subjected internally to fluid pressure, some of the fluid under pressure passes along the joint between the hose and the surface 73 to the void 80. Pressure applied to the face 78 seals the joint between the rubber of the hose and the surfaces 63 and 69, preventing leakage along the bore surface 23' of the sleeve 12a. The rubber tip of the hose ply 21 is interlocked with the end portion 60 of the sleeve 12a by its engagement with the recess 70 in a manner to prevent longitudinal displacement of the hose within the sleeve by mechanical pressure or by fluid pressure exerted on the faces 78 and 79.

In this modified form of the invention, leakage is prevented longitudinally inwardly along the bore face 23' as above explained, and longitudinally outwardly between the sleeve and member 13a by means of the threaded joint at 72. The inner hose ply 21 is securely clamped between the sleeve and member 13a and locked against longitudinal movement by its engagement with the recess 70, and the outer hose ply 22 is securely attached to the sleeve in the manner already described in connection with the form of the invention shown in Fig. 1.

In the form of the invention shown in Fig. 4, the bore 23'' of a sleeve 12b has a slight taper, preferably of $\frac{1}{32}$ of an inch to each inch of its length, the diameter of the bore increasing from the outer to the inner end of the sleeve. The bore of the hose ply 21'' is constant in diameter and is the same as that of the hose at points beyond the inner end of the coupling, as at point 81. The ply 21'' is built up on its outer surface to snugly fit the tapered bore 23'' of the sleeve 12b between the outer end 84 of the sleeve 12b and the point 81 in a manner to be presently described. With the exception of the tapered bore of the sleeve 12b and the correspondingly built up ply 21'', the coupling shown in Fig. 4 is identical with that shown in Fig. 1.

The ply 21'' comprises, similarly to the ply 21 of the coupling shown in Fig. 1, an inner rubber tube 14'' and a layer 15'' consisting of a plurality of windings of fabric and contiguously enveloping the tube 14''. The layer 15'' of fabric windings is surrounded by a sheath 82 consisting of spirally wound wire and extending from a point 83 at some distance from the outer end 84 of the sleeve 12b to a point 85 well beyond the inner end 38'' of the sleeve. A second sheath 86 of spirally wound wire is disposed contiguously upon the sheath 82 extending from a point 87 approximately midway between the points 83 and 38'' to the point 85, at which the inner sheet of spirally wound wire 82 also terminates. Ribbons of cotton fabric 88 or similar organic material are wound upon the fabric layer 15'' to give a tapered exterior surface to ply 21'' between the points 84 and 83. Similarly, ribbons of fabric 89, 90, 91, and 92 are used to build up the inner ply 21'', so that its outside surface snugly fits the tapered bore 23'' of the sleeve 12b, and snugly fits the bore surface of the outer ply 22'' between the points 38'' and 81.

The sheaths 82 and 86 act as a stiffener resisting bending stresses which tend to break down and rupture the hose at the end 38'' of the sleeve. By the use of two such sheaths, the inner sheath extending along the sleeve bore well beyond the outer sheath, there is avoided a disadvantage inherent in the construction shown in Fig. 1. In the latter construction, if the ply 21 is subjected to severe longitudinal stresses sufficient to stretch and elongate it, the shell 39 of spirally wound wire is pulled inwardly by the ply 21 to which it is attached, pulling away from the shoulder of the sleeve 12 at 36 and leaving a gap into which the material of the fabric layer 15 may be forced by fluid pressure within the hose. If the longitudinal stress which has thus elongated the ply 21 is removed and the shell 39 moves backward toward its original position, the material of the fabric layer 15 is pinched and damaged. In the construction as shown in Fig. 4, the tapered fabric windings 88 and 89 of cotton or similar organic material, being a part of the hose ply 21" move with the sheaths 82 and 86 along the tapered bore 23" and no gap is formed at the outer end of these sheaths when the hose is subjected to tensile stresses which tend to stretch and displace it longitudinally with respect to the bore of the coupling member 12b. It is obvious that such a desired result is obtainable only by providing the bore of the sleeve 12b with a slight taper such as has been described above.

When the hose and the sleeve 12b are being assembled, the tapered character of the bore 23" and of the exterior surface of the ply 21" makes it possible to effect a close fitting, tight contact between the ply 21" and the bore of the sleeve 12b between the points 84 and 38".

Figure 5:
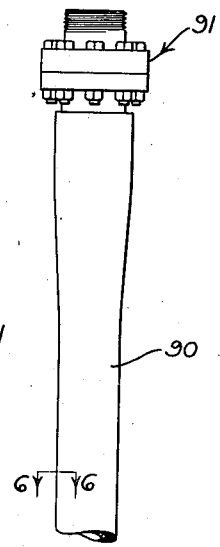
Fig. 5 is a section of hose provided at each end with a coupling, the hose and hose couplings being constructed in accordance with my invention.

Fig. 5 shows a section of hose 90 with a coupling 91 at one end and a coupling 92 at the other end, each of these couplings being constructed and secured to the respective ends of the hose section 90 in the manner which has been above described.

Figure 6:
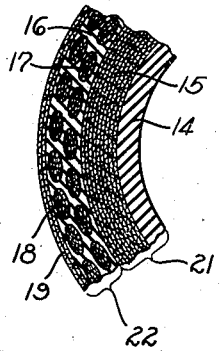
Fig. 6 is an enlarged fragmentary cross-sectional view of the hose taken along the line 6—6 of Fig. 5.

Fig. 6 shows the internal construction of the hose, the various layers, plies, and elements of the hose being numbered as in Fig. 1.

Figure 7:
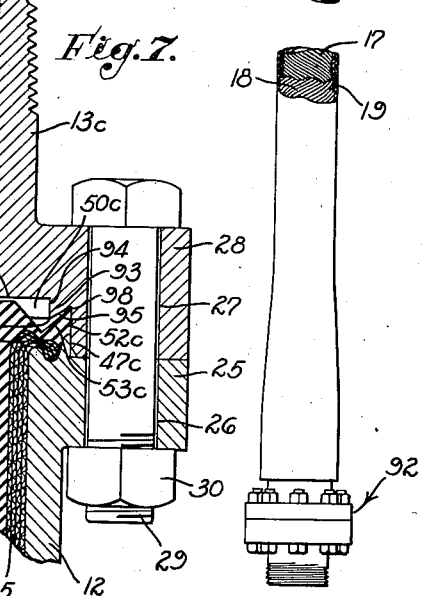
Fig. 7 is a fragmentary cross-sectional view, similar to Figs. 1 and 4, showing another form of the invention.

The construction of the form of the invention shown in Fig. 7 is the same as that shown in Figs. 1 and 4, with the exception of the provision of a baffle tongue 93 on the member 13c. This baffle tongue has an upper face 94 perpendicular to the face 46c of the member 13c, and an under face 95 forming an angle of approximately 30° with faces 94 of the baffle tongue and 47c of member 13c. The upper face 94 of this baffle tongue is in position to act as a baffle wall with respect to the stream of fluid entering the recess 50c from a joint 96 between the member 13c and the hose end 55c. The tip or meeting edge 97 of the upper face 94 and under face 95 of the tongue 93 is so disposed in the recess 50c that it is spaced from both faces of this recess. The meeting edge 98 of the under face 95 of the tongue 93 with the face 47c of the member 13c is disposed at the tip of the tongue 52c formed on the hose end 55c, the upper face 53c of the tongue 52c which is also the outermost wall of the recess 50c forming with the under face 95 of the baffle or tongue 93 an angle of approximately 15°.

It is apparent that when fluid pressure is first applied to the coupling the initial rush of fluid through the joint 96, which might otherwise force its way under the tongue 52c, is diverted in a direction perpendicular to the passageway 96, passing around the tip 97 of the baffle tongue 93 and entering the space between that tongue and the outer face 53c of the recess where it acts to effectively and firmly hold the flexible tip of the rubber tongue 52c tightly against the surface 47c.

Many minor changes of construction can be made in the coupling without departing from the principles of my invention, which is defined in the following claims.

I claim as my invention:

1. In a hose structure, the combination of: a flexible hose having embedded therein a set of wire strands extending in a leftward spiral from end to end thereof to form a cylindrical reinforcing layer, and another set of wire strands extending in a rightward spiral from end to end thereof to form a cylindrical reinforcing layer of a different diameter; a metallic coupling member at one end of the hose; and two sets of lugs formed on said member, the lugs of one set being inclined to the hose axis with respect to their longitudinal lines to correspond to the direction of wrap of one set of said wire strands, and the lugs of the other set being inclined to the hose axis with respect to their longitudinal lines to correspond to the direction of wrap of the other set of wire strands, the strands of each set being arranged in pairs, the two strands of each pair being joined by an integrally connected loop disposed about a corresponding one of said lugs.

2. In a fluid tight joint structure, comprising a relatively incompressible first member, and a compressible and flexible second member: a compressible and flexible tongue on said second member disposed to lie with its under face flat against a surface on said first member; means for conducting fluid under pressure to the upper face of said tongue to force said tongue against said surface on said first member; and a relatively inflexible baffle means carried by said first member interposed in said conducting means, said baffle means overlying and being spaced from the upper face of said tongue.

3. In a hose coupling, the combination of: hollow cylindrical primary and secondary members formed with mating end thrust flat annular faces; means for clamping together said members in axial alignment with said faces in end thrust relationship, said members being formed on juxtaposed portions thereof with annular faces radially inside of said end thrust faces to provide, when held in said end thrust relationship, an inwardly opening annular chamber; and a flexible hose comprising an inner ply of rubber and an enveloping ply of fabric material integrally united therewith, said hose being disposed against the bore face of said primary member, and being expanded at its end to form an annular flange loosely seated in said chamber, the inner rubber ply of said flange being formed with an annular recess opening on a surface of said secondary member which fronts on said chamber, said recess being disposed to receive fluid under pressure from within said coupling by way of the joint between said flange and secondary member and said recess providing an annular flap on said flange adapted to be expanded by the pressure of said fluid within said recess to effect a sealing contact with a surface of said secondary member fronting on said chamber.

ADELBERT M. GRAHAM.